Patented Sept. 29, 1953

2,653,922

UNITED STATES PATENT OFFICE 2,653,922

HYDROPEROXY-SUBSTITUTED ROSIN MATERIALS AND A METHOD FOR THEIR PRODUCTION

Forrest L. McKennon, New Orleans, La., and Ray V. Lawrence, Lake City, Fla., assignors to the United States of America as represented by the Secretary of Agriculture No Drawing. Application January 19, 1951, Serial No. 206,907

9 Claims. (Cl. 260—83.7)

(Granted under Title 35, U. S. Code (1952), sec. 266)

The invention herein described may be manufactured and used by or for the Government of the United States of America for governmental purposes throughout the world without the payment of any royalty thereon.

This invention provides valuable new compounds, hydroperoxy-substituted rosin materials; valuable new compositions, hydroperoxy-substituted rosin materials dissolved in rosin materials; and a method of preparing said compounds and compositions.

Rosin is a specific kind of natural resin obtained as a vitreous water-insoluble material from pine oleoresin by removal of the volatile oils. It consists primarily of tricyclic monocarboxylic acids having the general empirical formula $C_{20}H_{30}O_2$, with small quantities of compounds saponifiable only with boiling alcoholic potassium or sodium hydroxide, and some unsaponifiable matter. ("A. S. T. M. Standards 1949" Part 4, Paint, Naval Stores, Wood, Adhesives, etc., page 573.) Throughout the specification and claims, the term "rosin acids" refers to the acids which occur in rosin; the term "methyl abietate" refers to the article of commerce, "a mixture of the methyl esters of rosin acids" (Merck Index, Sixth Edition, Merck & Co. 1952); and the term "rosin material" refers to rosin, the components of rosin or the derivatives of rosin or its components.

The new compositions have a unique value in the initiation of reaction proceedings by a free radical mechanism, such as polymerization reactions, particularly where a tacky, elastic polymer is desired. They also form valuable intermediates for the production of hydroxy-substituted rosin materials; and thus, for the synthesis of a wide variety of pharmaceuticals containing a nucleus of proven physiological activity.

Whereas prior oxidations of rosin have resulted in a conversion to quinoidal structures followed by ring cleavage to form polycarboxylic acids or have required such severe conditions that the principal products were the oxides of carbon, we have found that when the oxidation is initiated at a moderately elevated temperature which is lowered in increments as the active oxygen content increases, valuable peroxidic compositions are produced.

The novel compositions provided by the invention contain peroxy groups principally in the form of hydroperoxy groups. We have found that the chemical properties of the compositions can be varied at will by applying to the rosin material to be used treatments such as "stabilizing" and "purification." For example, from a hydrogenated methyl abietate which has been washed with caustic a product having a greater active oxygen content can be obtained in less time at a more elevated temperature than could be employed in the conversion of a unwashed or a non-hydrogenated rosin material.

The preferred class of compositions provided by the present invention consists of a solution containing at least 500 milliequivalents of oxygen per kilogram of the hydroperoxy-substituted rosin materials produced in situ by the action of gaseous oxygen upon purified stabilized rosin materials having a ring and ball softening point of not more than 80° C.

Such solutions comprise solutions in which the solute consists essentially of hydroperoxy-substituted rosin materials produced in situ by the action of gaseous oxygen upon purified stabilized rosin materials having a ring and ball softening point of not more than about 80° C., the solvent consists essentially of a rosin material identical with the rosin material in which said solute was produced, and the solute is present in a proportion providing a solution containing at least 500 milliequivalents of oxygen per kilogram.

The term "stabilized" as applied to rosin materials is used throughout the specification and claims to refer to rosin materials having an improved storage stability due to a decrease in the number of ethylenic bonds.

A particularly preferred class of stabilized rosin materials consists of normally liquid esters of hydrogenated rosin acids i. e., those in which the number of ethylenic bonds has been reduced by the addition of hydrogen. Hydrogenated rosin derivatives in which 50% or more of the ethylenic bonds have been removed are especially suitable.

The disproportionated rosin derivatives, i. e., rosin derivatives in which the number of ethylenic bonds has been reduced by the conversion of olefinic rings to aromatic rings (preferably to the extent of reducing the abietic acid content to below 1%), constitute a particularly suitable class of stabilized rosin materials.

The term "purified" as applied to rosin materials is used throughout the specification and claims to refer to rosin materials which have been intimately contacted with an aqueous alkali metal hydroxide containing from 0.5 to 20 percent alkali metal hydroxide and separated from the components soluble in the aqueous phase, or have been fractionally distilled, or have been contacted with activated adsorbents such as fuller's earth, alumina, or other activated clays.

The oxidation of a rosin material in accordance with the process of the invention is preferably initiated at a temperature of from 50° to 120° C. The temperature is lowered in increments of from 5° to 20° C. as the rate of increase in active oxygen content begins to decrease appreciably; until the further lowering of the temperature fails to appreciably increase said rate.

The process of the present invention does not require the employment of a catalyst, although any of the oxidation catalysts suitable for use in the peroxidation of organic materials by the action of an oxygen containing gas can be suitably employed.

Since the process does not require a catalyst it has the particular advantage of avoiding a tedious and difficult separation of a high boiling contaminant from a high boiling product.

While about 6000 milliequivalents of oxygen per cc. can theoretically be introduced we have found that the peroxidic rosin compositions provided by the present invention containing as little as 500 milliequivalents per kilogram have unique and valuable properties. The efficiency of the peroxidic compositions (thus their general value), increases directly as the number of milliequivalents of oxygen per kilogram increases.

The peroxidic compositions prepared by the process of our invention can be concentrated by any conventional means. For example, by dissolving the composition in a non-polar solvent such as hydrocarbon and extracting with a polar solvent such as an aqueous alcohol, or by a low pressure carrier gas distillation to strip off the volatile components.

In the preparation of synthetic rubbers, the hydroperoxides of the present invention have the unique property of not only efficiently initiating the polymerization reaction but in providing improved properties in the rubber due both to a uniform polymerization and to the incorporation in the polymer of rosin a rosin material. The importance of this latter feature is illustrated by the fact that in an evaluation of rosin and terpine chemicals in GR–S tire tread compounds Lyle O. Amberg and John H. Elliott state:

"This work indicates that those rosin-derived materials, whose predominantly resin acid character has not been drastically altered, should give satisfactory processing properties, improved aged hot flex cut-growth resistance, good tensile and tear strengths, and improved elongation to the GR–S tire tread formula studied." (Indian Rubber World 112, 309–12 (1945).)

The following examples are presented solely for the purpose of illustrating in detail certain particular features of the invention. However, as numerous modifications in compounds and operational steps are within its scope, the invention is not to be construed as being limited only to the materials and methods specified in the examples.

EXAMPLE I

*A method of preparing a peroxidic stabilized and purified rosin composition*

Oxygen was bubbled through 165 cc. of hydrogenated, caustic-washed methyl abietate while it was agitated at 100° C.

The peroxide number, P. N. (the milliequivalents of oxygen per kilogram) increased continuously for 8 hours; reaching a value of 369, at which time the rate of increase had declined.

Upon lowering the reaction temperature to 80° C. the rate of increase in P. N. rose and the P. N. increased continuously for an additional 23 hours, reaching a value of 1836.

The peroxidic composition so produced was a solution in which the solute consisted essentially of hydroperoxy-substituted rosin materials produced in situ by the action of gaseous oxygen upon hydrogenated, caustic-washed methyl abietate, the solvent consisted essentially of hydrogenated caustic-washed methyl abietate, and the solute was present in a proportion providing a solution containing 1836 milliequivalents of oxygen per kilogram.

EXAMPLE II

*A method of isolating a hydroperoxy-substituted rosin material*

A 20 gram sample of a hydrogenated, caustic-washed methyl abietate which had been peroxidized to a P. N. of 1884 in a manner analogous to that of Example I was mixed with 20 cc. of methyl alcohol. Upon the addition of 20 cc. of hexane a homogeneous solution was formed. Enough distilled water to form an 85% aqueous alcohol was added, resulting in the formation of two liquid phases. The aqueous layer was removed and the hexane solution was washed four times with 20 cc. portions of 85% methyl alcohol.

The residue from the hexane solution was a gummy solid having a P. N. of 3060.

The hydroperoxy-substituted rosin material so produced was a methyl abietate rosin material predominantly consisting of a hydroperoxy-substituted, hydrogenated, caustic-washed methyl abietate.

EXAMPLE III

*A method of preparing a peroxidic stabilized rosin composition*

Oxygen was bubbled through 400 cc. of hydrogenated methyl abietate while it was agitated at 80° C.

The P. N. increased to 777 over a period of 170 hours and fell to a value of 500 when the reaction was continued for an additional 3 hours.

EXAMPLE IV

*An application of the peroxidic rosin compositions*

A butadiene-styrene monomer composition consisting of a standard formulation (butadiene 71.5, styrene 28.5, mercaptan modifier 0.2, rosin type soap 4.7, and water 180 parts) for the production of cold rubber at 5° C. was polymerized in the usual manner in the presence of the indicated amounts of a hydrogenated, caustic-washed methyl abietate hydroperoxide composition having a P. N. of 3060.

Since this hydroperoxide has a high molecular weight, a consideration of the amounts of conversion in the indicated times indicates that upon a molar base (commonly used in charging peroxide polymerization initiators) it compares favorably with and even excels some of the commonly used peroxides in rate of polymerization initiated. In addition to being an efficient initiator, this hydroperoxide composition introduces into the polymer structural groupings having a pronounced beneficial effect upon the properties of the polymer.

| Amount of Initiator (based upon 100% peroxide) | Percent conversion in— | | |
|---|---|---|---|
| | 5 Hours | 10 Hours | 15 Hours |
| 0.1 | 1.9 | 3.4 | 2.6 |
| 0.1 | 3.0 | 3.1 | 2.4 |
| 0.3 | 20.1 | 39.3 | 55.6 |
| 0.3 | 27.1 | 46.4 | 69.5 |
| 0.4 | 16.3 | 33.3 | 52.2 |
| 0.4 | 16.3 | 38.3 | 55.1 |
| 0.5 | 14.5 | 30.5 | 47.7 |
| 0.5 | 14.1 | 30.9 | 43.9 |

Having thus described our invention we claim:

1. A process comprising oxidizing a normally liquid ester of an hydrogenated rosin acid in which at least 50 percent of the ethylenic bonds have been removed by hydrogenation, the oxidation being initiated at a temperature of from 50° to 120° C., the temperature being lowered in decrements of 5° to 20° C., as the rate of increase in active oxygen content begins to decrease, until the further lowering of the temperature fails to appreciably increase said rate, the oxidation being by introducing gaseous oxygen, no catalyst being added.

2. The process of claim 1 in which the ester is caustic-washed hydrogenated, methyl abietate.

3. A process of copolymerizing butadiene and styrene in the cold comprising reacting butadiene and styrene monomers in an aqueous emulsion in the presence of a solution of caustic-washed methyl abietate hydroperoxide in methyl abietate oxidized by the process of claim 2.

4. A process of producing cold rubber comprising reacting butadiene and styrene monomers in aqueous emulsion below room temperature in the presence of hydroperoxy-substituted hydrogenated, caustic-washed, methyl abietate, in which at least 50% of the ethylenic bonds had been removed by hydrogenation, to copolymerize the monomers.

5. The process of claim 4, in which the peroxide number of the abietate is about 3060.

6. The process of preparing a hydroperoxy-substituted material comprising bubbling oxygen through hydrogenated, caustic-washed methyl abietate, in which at least 50% of the ethylenic bonds have been removed by the hydrogenation, while agitating it, at about 100° C., in the absence of added catalyst, for several hours, and until the rate of increase of peroxide number declines, lowering the temperature to about 80° C. and continuing the oxidation for several more hours.

7. The process of preparing a hydroperoxy-substituted rosin material comprising bubbling oxygen through hydrogenated, caustic-washed methyl abietate, in which at least 50% of the ethylenic bonds have been removed by the hydrogenation, while agitating it, at about 100° C., in the absence of added catalyst, for several hours, and until the rate of increase of peroxide number declines, lowering the temperature to about 80° C. and continuing the oxidation for several more hours and concentrating the hydroperoxy substituted rosin material so produced by mixing the product with methyl alcohol and with hexane, adding water, and separating the aqueous alcohol layer that forms from the hexane solution of the hydroperoxy material.

8. A solution in which the solute consists essentially of hydroperoxy-substituted rosin materials produced in situ by the action of gaseous oxygen upon a rosin material having a ring and ball softening point of not more than about 80° C.; the solvent consists essentially of a rosin material identical with the rosin material in which said solute was produced; and the solute is present in a proportion providing a solution containing at least 500 milliequivalents of oxygen per kilogram.

9. A methyl abietate rosin material predominantly composed of a hydroperoxy-substituted, hydrogenated, caustic-washed methyl abietate containing at least 500 milliequivalents of oxygen per kilogram.

FORREST L. McKENNON.
RAY V. LAWRENCE.

References Cited in the file of this patent
UNITED STATES PATENTS

| Number | Name | Date |
|---|---|---|
| 2,434,643 | Drake | Jan. 20, 1948 |
| 2,435,831 | Harvey | Feb. 10, 1948 |
| 2,554,810 | Breslow | May 29, 1951 |